No. 822,839. PATENTED JUNE 5, 1906.
M. A. FRY.
PROCESS FOR FACILITATING THE REMOVAL OF ROOTS OF STUMPS.
APPLICATION FILED MAR. 19, 1906.
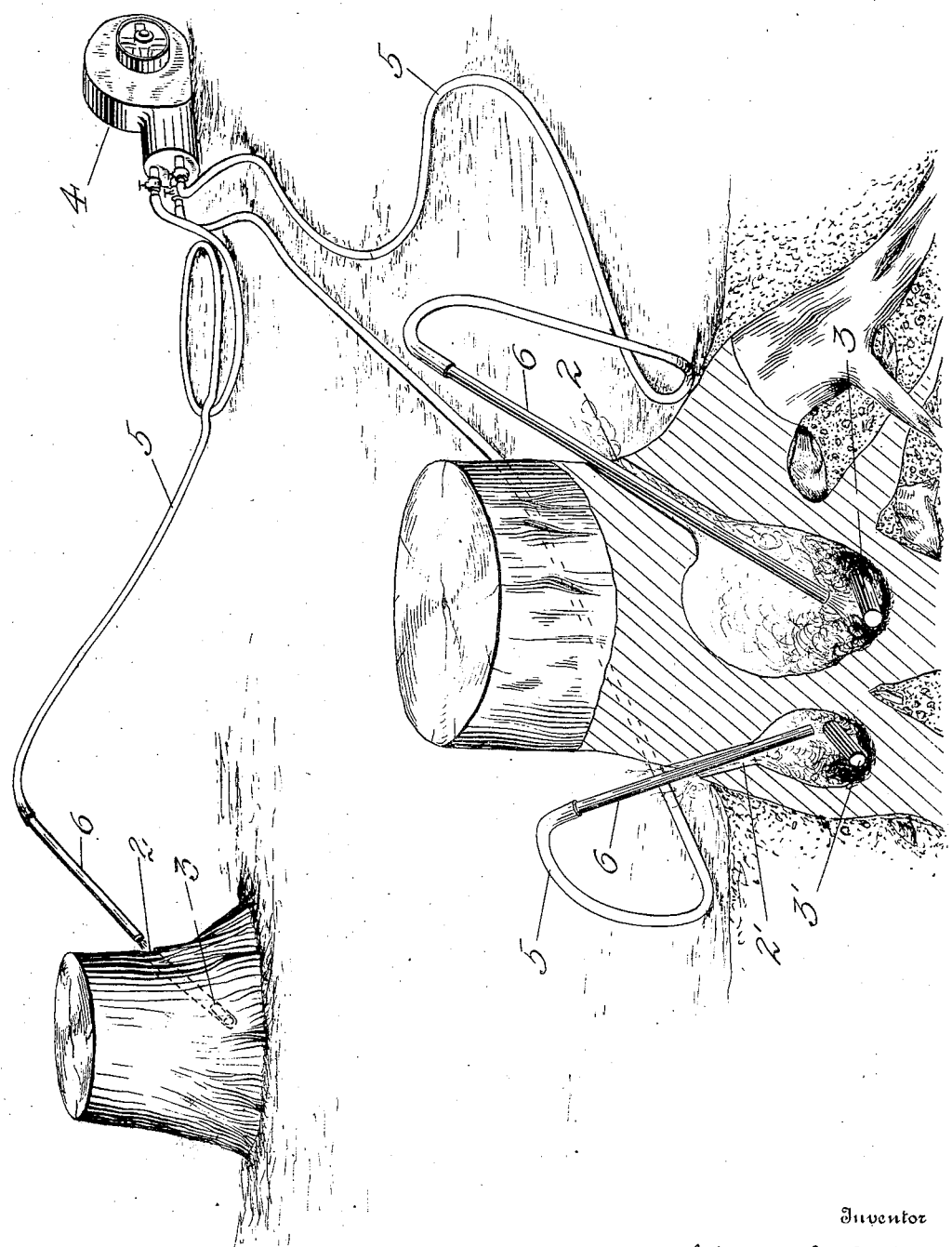
Witnesses
Edward W. Cressman
Arlita Adams
Inventor
Mason A. Fry.
By Adams & Brooks
Attorneys

UNITED STATES PATENT OFFICE.

MASON A. FRY, OF SEATTLE, WASHINGTON.

PROCESS FOR FACILITATING THE REMOVAL OF ROOTS OF STUMPS.

No. 822,839.　　　　Specification of Letters Patent.　　　　Patented June 5, 1906.

Application filed March 19, 1906. Serial No. 306,915.

*To all whom it may concern:*

Be it known that I, MASON A. FRY, a citizen of the United States of America, and a resident of the city of Seattle, in the county of King and State of Washington, have invented certain new and useful Improvements in Processes for Facilitating the Removal of Roots of Stumps, of which the following is a specification.

My invention relates to an improved process for facilitating the removal of roots of stumps; and the primary object thereof is to provide a novel process by means of which fire will be carried down into the roots of the stump and caused to burn said roots asunder, thereby freeing the stump.

The drawing is a view in perspective, showing my improved process carried on in connection with a plurality of stumps, the stump in the foreground being shown in partial section.

The method now usually practiced for freeing a stump by chopping away its roots, so that said stump can be removed and its roots can be separately removed by means of grapples or other suitable contrivances, is tedious and unsatisfactory, as the dirt has to be first excavated from about the roots, and in dealing with large stumps—as, for example, those of fir-trees—it is almost impossible to reach the tap or other large inner roots.

My invention therefore aims to provide an improved process by which stumps can be effectively freed from their roots with a saving of labor and expense.

In carrying out my process a stump to be operated upon (indicated by reference-numeral 1) is provided with an opening 2 of suitable diameter, which preferably extends directly over the root (shown as the tap-root) desired to be severed. A body 3 of refractory material, preferably of iron, which has been heated to a high temperature, is then inserted into the opening, and a blast of air is then directed onto and about the body 3 to promote combustion. Now, as is obvious, the wood beneath and around the body 3 will catch fire, and such fire being fanned by the blast of air will completely envelop the body 3, and thereby keep it at red heat, and as the wood beneath the body 3 burns away said body will fall by gravity and gradually burn a hole down into the underlying root. When body 3 moves a little lower than is shown in the stump in the foreground in the drawing, the fire will burn completely through the walls of the root, and thereby sever it from the stump. Large roots can be severed at eighteen inches or more below the surface of the ground, and in such instances it is obviously unnecessary to afterward remove the remainder of the roots, as they are too far below the surface of the ground to interfere with the tilling thereof.

Other holes, as 2', are formed in the stump, as is found necessary to effect severance of the other large roots thereof, and heated metal bodies 3', corresponding to the body 3, placed in these holes and the combustion maintained as in the operation explained in connection with the severing of the tap-root.

By my process it will be observed that after a fire has been started in one stump the operator can also start fires in one or more other stumps within a reasonable area, the bodies 3, as heretofore explained, carrying the fire to the desired points without requiring any attention of the operator.

The means for supplying air to the several fires in the stumps consists of a suitable blower 4, pipes 5, leading therefrom, and nozzles 6. These nozzles are elongated and adapted to be inserted into the openings of the stump, they being of less diameter than said openings, so that spaces thereabout will be provided through which the smoke and unconsumed gases from the fires can escape.

In order to cause the fires to burn with more intensity about the bodies 3, the respective nozzles are moved gradually into the stump, according to the progress of said bodies. In the drawing the stump in the background is shown as just having had a body 3 inserted in the opening 2 thereof and the nozzle 6 about to be inserted to direct a blast of air thereon, while the stump in the foreground is shown as having two fires therein, which have been burning for a considerable period of time, so that the bodies 3 are considerably below the openings 2 2', and the nozzles 6 have been moved into the stump, so as to maintain the proper relation between them and said bodies.

Having thus described my invention, what I claim as new, and desire to secure by Letters Patent of the United States of America, is—

1. The herein-described process which consists in arranging a hot body formed of refractory material in an opening in a stump, said body being free to move by gravity, and directing a blast of air into the fire about said body.

2. The herein-described process for severing a root from a stump by burning, which consists in placing a heated body of refractory material in the stump, said body being free to move by gravity, and maintaining said body heated so that it will burn its way down into the root and set fire to the same.

Signed at Seattle, Washington, this 6th day of March, 1906.

MASON A. FRY.

Witnesses:
STEPHEN A. BROOKS,
ARLITA ADAMS.